United States Patent
Eide et al.

(10) Patent No.: US 10,762,076 B1
(45) Date of Patent: Sep. 1, 2020

(54) MEMORY EFFICIENT DATABASE CHANGE MANAGEMENT

(71) Applicant: Medallia, Inc., Palo Alto, CA (US)

(72) Inventors: Kristian Eide, Palo Alto, CA (US);
Cory Mead, San Francisco, CA (US);
Guido de Caso, Buenos Aires (AR);
Franco Musi, Buenos Aires (AR)

(73) Assignee: Medallia, Inc., Palo Alto, CA (US)

( * ) Notice: Subject to any disclaimer, the term of this patent is extended or adjusted under 35 U.S.C. 154(b) by 903 days.

(21) Appl. No.: 15/294,500

(22) Filed: Oct. 14, 2016

(51) Int. Cl.
*G06F 16/23* (2019.01)
*G06F 16/25* (2019.01)

(52) U.S. Cl.
CPC ........ *G06F 16/2379* (2019.01); *G06F 16/252* (2019.01)

(58) Field of Classification Search
None
See application file for complete search history.

(56) References Cited

U.S. PATENT DOCUMENTS

| | | | | |
|---|---|---|---|---|
| 7,865,545 | B1* | 1/2011 | Estrada | G06F 16/958 709/201 |
| 2002/0156850 | A1* | 10/2002 | Hamscher | G06Q 30/06 709/205 |
| 2003/0028562 | A1* | 2/2003 | Shaughnessy | G06F 17/243 715/234 |
| 2010/0257457 | A1* | 10/2010 | De Goes | G06Q 10/10 715/751 |
| 2014/0181969 | A1* | 6/2014 | Mousty | H04L 63/1408 726/23 |
| 2015/0227533 | A1* | 8/2015 | Goldstein | G06F 16/2379 707/661 |
| 2017/0147527 | A1* | 5/2017 | Chandrasekaran | H04L 67/02 |
| 2017/0277905 | A1* | 9/2017 | Bjorg | G06F 21/6218 |
| 2017/0329812 | A1* | 11/2017 | Evers | G06F 16/93 |

\* cited by examiner

*Primary Examiner* — Richard L Bowen

(57) ABSTRACT

A request to modify a data set is received. The data set comprises a plurality of entries where the plurality of entries have a corresponding edit state and the corresponding edit state indicates whether a corresponding entry in the plurality of entries is in a published state or a preview state. The data set is modified at least in part by creating a draft entry based at least in part on the request. An edit state of the draft entry indicates that the draft entry is in the preview state. A request to render the data set is received. The request indicates whether to render a published version or a preview version. Entries of the data set to be rendered are determined based at least in part on the edit state of the entries. The determined entries of the data set are provided to a user interface layer that renders the determined entries in a display.

19 Claims, 19 Drawing Sheets

610 — Report

| ID | Name | ... | Draft | Edit State |
|---|---|---|---|---|
| 1 | Foo | | 4 | Published_Has_Updated_Draft |
| 2 | ABC | | | |
| 3 | XYZ | | | |
| 4 | Bar | | | Updated_Draft |

611 — row 1
612 — row 2
613 — row 3
614 — row 4

620 — Modules

| ID | Report_ID | Name | ... | Draft | Edit State |
|---|---|---|---|---|---|
| 11 | 1 | Mod_1 | | 13 | Published_Has_Updated_Draft |
| 12 | 2 | Mod_2 | | | |
| 13 | | Mod_A | | | Updated_Draft |

621 — row 1
622 — row 2
623 — row 3

FIG. 6A

610 — Report

| ID | Name | ... | Draft | Edit State |
|---|---|---|---|---|
| 1 | Bar | | | |
| 2 | ABC | | | |
| 3 | XYZ | | | |

611 → row with ID 1
612 → row with ID 2
613 → row with ID 3

620 — Modules

| ID | Report_ID | Name | ... | Draft | Edit State |
|---|---|---|---|---|---|
| 11 | 1 | Mod_A | | | |
| 12 | 2 | Mod_2 | | | |

621 → row with ID 11
622 → row with ID 12

FIG. 6C

Report — 710

| ID | Name | ... | Draft | Edit State |
|---|---|---|---|---|
| 1 | Foo | | | |
| 2 | ABC | | | |
| 3 | XYZ | | | |
| 4 | Foz | | | Created_Draft |

711, 712, 713, 714

Modules — 720

| ID | Report_ID | Name | ... | Draft | Edit State |
|---|---|---|---|---|---|
| 11 | 1 | Mod_1 | | | |
| 12 | 2 | Mod_2 | | | |
| 13 | 5 | Mod_3 | | | Created_Draft |

Report 710

| ID | Name | ... | Draft | Edit State |
|---|---|---|---|---|
| 1 | Foo | | | |
| 2 | ABC | | | |
| 3 | XYZ | | | |
| 4 | Foz | | | |

711, 712, 713, 714

Modules 720

| ID | Report_ID | Name | ... | Draft | Edit State |
|---|---|---|---|---|---|
| 11 | 1 | Mod_1 | | | |
| 12 | 2 | Mod_2 | | | |
| 13 | 5 | Mod_3 | | | |

810 — Report

| ID | Name | ... | Draft | Edit State |
|---|---|---|---|---|
| 1 | Foo | | 4 | Published_Has_Deleted_Draft |
| 2 | ABC | | | |
| 3 | XYZ | | | |
| 4 | Foo | | | Deleted_Draft |

811, 812, 813, 814

820 — Modules

| ID | Report_ID | Name | ... | Draft | Edit State |
|---|---|---|---|---|---|
| 11 | 1 | Mod_1 | | | |
| 12 | 2 | Mod_2 | | | |

810 — Report

| ID | Name | ... | Draft | Edit State |
|---|---|---|---|---|
|  |  |  |  |  |
| 2 | ABC |  |  |  |
| 3 | XYZ |  |  |  |
|  |  |  |  |  |

812 → row with 2, ABC
813 → row with 3, XYZ

820 — Modules

| ID | Report_ID | Name | ... | Draft | Edit State |
|---|---|---|---|---|---|
| 11 | 1 | Mod_1 |  |  |  |
| 12 | 2 | Mod_2 |  |  |  |

821 → row with 11, 1, Mod_1
822 → row with 12, 2, Mod_2

FIG. 8C

910 — Report

| ID | Name | ... | Draft | Edit State |
|---|---|---|---|---|
| 1 | Foo | | 4 | Published_Has_Updated_Draft |
| 2 | ABC | | | |
| 3 | XYZ | | | |
| 4 | Bar | | 5 | Updated_Draft |
| 5 | Foz | | | Updated_Draft |

911 — row 1
912 — row 2
913 — row 3
914 — row 4
915 — row 5

920 — Modules

| ID | Report_ID | Name | ... | Draft | Edit State |
|---|---|---|---|---|---|
| 11 | 1 | Mod_1 | | | |
| 12 | 2 | Mod_2 | | | |
| 13 | | Mod_A | | | Updated_Draft |

921 — row 1
922 — row 2
623 — row 3

FIG. 9A

MEMORY EFFICIENT DATABASE CHANGE MANAGEMENT

BACKGROUND OF THE INVENTION

A database may experience several modifications. Data may be edited, added, and/or deleted. When a modification to the database occurs, the database is updated, and the modification is immediately published. Without sufficient safeguards in place, erroneous modifications to the data may be published and viewable by any user with access to the database. One way to prevent erroneous data from being published is to maintain a separate edited version of the database, and only allow new content to be published after it has been audited. Maintaining a separate copy of the database, however, significantly increases the amount of system resources required to store the data and can be impractical for large scale systems. It would be useful to create a system that efficiently stores the modifications to the database and prevents erroneous modifications from being published.

BRIEF DESCRIPTION OF THE DRAWINGS

Various embodiments of the invention are disclosed in the following detailed description and the accompanying drawings.

FIG. 6A is a diagram illustrating example data sets that include an entry to be edited.

FIG. 6C is a diagram illustrating example data sets that include edits that have been committed.

FIG. 7A is a diagram illustrating example data sets that include an entry to be added to the data set.

FIG. 7C is a diagram illustrating example data sets that include edits that have been committed.

FIG. 8A is a diagram illustrating example data sets that include an entry that is to be deleted.

FIG. 8C is a diagram illustrating example data sets that include edits that have been committed.

FIG. 9A is a diagram illustrating example data sets that are under review by an administrator user, but are being edited by an edit user.

DETAILED DESCRIPTION

Figure 1:
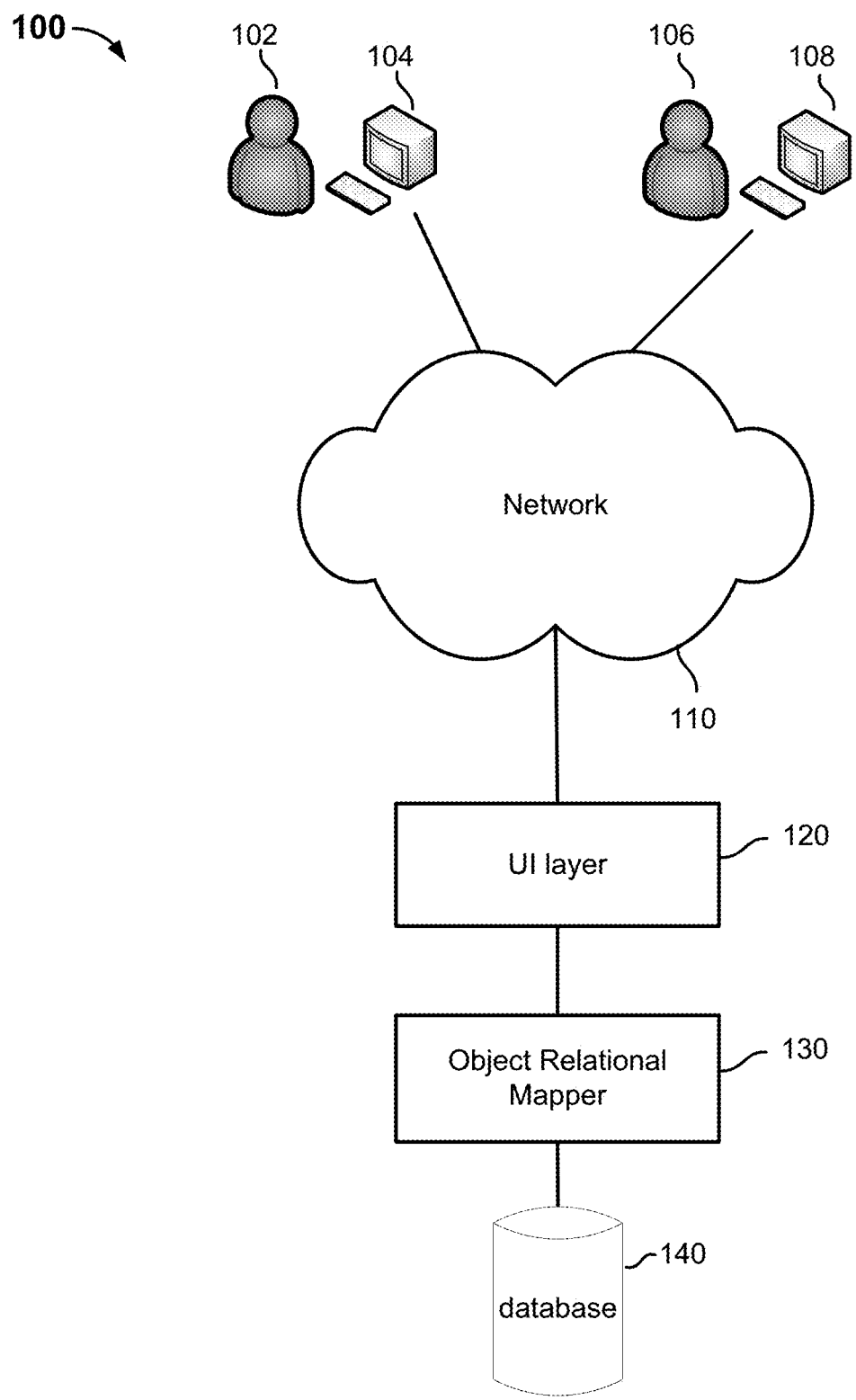
FIG. 1 is a diagram illustrating an embodiment of a system for database change management.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A database change management technique is disclosed. An existing data set includes a plurality of entries and each entry is comprised of one or more values. The existing data set can be modified in a number of ways. For example, an entry can be added to the data set, an entry can be edited, or an entry can be deleted from the data set. Modifications to the existing data set are immediately publishable and capable of being viewed by any user, but preferably require approval by an administrator before being published because the modifications may contain errors. In other situations, an administrator may desire to batch a set of the database changes and publish the set of database changes at the same time.

To manage the modifications to an existing data set, the database change management technique modifies the existing data set to support draft modifications. A data set supports draft modifications if it includes draft values and edit state values and is capable of being modified through the use of draft entries. A draft entry is created and added to the data set when a modification is to be made to the data set. When an entry is to be added to the data set, a draft entry is created and added to the data set, and the edit state value of the draft entry is updated to indicate a new entry. When an entry is to be edited or deleted from the data set, a draft entry is created and added to the data set, the draft value of the entry to be edited or deleted is updated to be an ID value associated with the draft entry, and the edit state values of the entry to be edited or deleted and the draft entry are updated to indicate the type of modification being made to the data set.

A user with approval privileges can view the modifications to the data set in a preview version of the data set and either commit or discard the modifications. Subsequently, the draft entries and associated draft and edit state values are removed from the data set. The use of draft entries, draft values, and edit states reduces the overhead in maintaining the data set while allowing for review and publication, and also reduces the amount of memory required to store the data set.

FIG. 1 is a diagram illustrating an embodiment of a system for database change management. In the example shown, the system 100 includes a user interface (UI) layer 120, an object relational mapper (ORM) 130, and a database 140. UI layer 120 is connected to client devices 104, 108 via network 110. Users such as 102, 106, etc. can access data sets stored in database 140 via client devices 104, 108, etc. respectively.

Users 102, 106 can be a regular user, an edit user, or an administrator user. In this example, a regular user has access to a published version of one or more data sets stored in database 140 and has the ability to view the published data sets via a client device, such as client devices 104, 108. A regular user is unable to make changes to the data sets, discard changes to the data set, or commit changes to the data set. An edit user has access to a published version or a preview version of one or more data sets stored in database 140 and has the ability to make one or more changes to the data sets. In some embodiments, an edit user is unable to discard or commit changes to the data sets. In some embodiments, an edit user is able to discard or commit changes to the data set. An administrator user has access to a published or preview version of one or more data sets stored in database 140, has the ability to make one or more changes to the data sets, and has the ability to commit or discard one or more modifications made to the data set. The type of user is determined based on a login credential of the user. Privileges (e.g., edit, view, discard, commit, etc.) associated with the login credential are stored in database 140. ORM 130 receives a login credential via UI layer 120 and provides the user with privileges to the data sets stored in database 140 based on the login credential.

Client devices 104, 108 can be a computer, a laptop, a desktop, a tablet, a mobile device, a PDA, or any other appropriate device that includes or is connected to a user interface device (e.g., a display) capable of displaying data. In this example, client devices 104, 108 include software that renders a UI that is draft aware. A UI is draft aware in the event the UI is configured to allow the users to make modifications to a data set via draft entries, draft values, and edit states. In some embodiments, client devices 104, 108 include software that renders a UI that is not draft aware. A UI is not draft aware in the event the UI is not configured to allow the users to make modifications to a data set via draft entries, draft values, and edit states.

Network 110 connects client devices 104, 108, etc. with UI layer 120. Network 110 comprises one or more of the following: a local area network, a wide area network, a wired network, a wireless network, the Internet, an intranet, or any other appropriate communication network.

UI layer 120 renders one or more data sets stored in database 140 for a client device, such as client devices 104, 108, etc. Depending upon the type of user accessing the UI layer, UI layer 120 renders a published version of the data set or a preview version of the data set. The published version of the data set includes entries that have been approved (i.e., commit and publish) to be published. An entry is a published entry after it has been approved by a user with approval privileges, (e.g., an edit user or an administrator user). The preview version of the data set includes published entries that are not subject to modification and draft entries that have not been approved. For example, the published version is rendered for a regular user, and the preview version is rendered for an edit user or an administrator user.

ORM layer 130 enables a user to make changes to a data set. A user can modify an entry of a data set, create an entry of a data set, delete an entry of a data set, discard a modification made to an entry of a data set, or commit a modification made to an entry of a data set. A user can input one or more modifications to the data set via a client device. UI layer 120 receives the input and provides the input to ORM 130. In response to receiving the input, ORM 130 modifies the data set stored in database 140. In some embodiments, ORM 130 can be implemented using one or more computing devices such as a computer, a multi-processor system, a microprocessor-based system, a special purpose device, a distributed computing environment including any of the foregoing systems or devices, or other appropriate hardware/software/firmware combination that includes one or more processors, and memory coupled to the processors and configured to provide the processors with instructions. In some embodiments, the ORM executes a custom piece of software developed in conjunction with the UI layer to provide the ORM functions. In some embodiments, the ORM executes a standard software package provided by a vendor (e.g., Hibernate® ORM). A combination of custom and standard software can also be used.

Database 140 stores one or more data sets. For example, the database can be a structured query language (SQL) database or other appropriate types of databases. The database can be stored in a memory and/or storage device internal to ORM 130, a memory and/or storage device attached to ORM 130, or any memory and/or storage device connected to ORM 130 via a network connection. The network connection may be a wired or wireless connection.

Figure 2A:
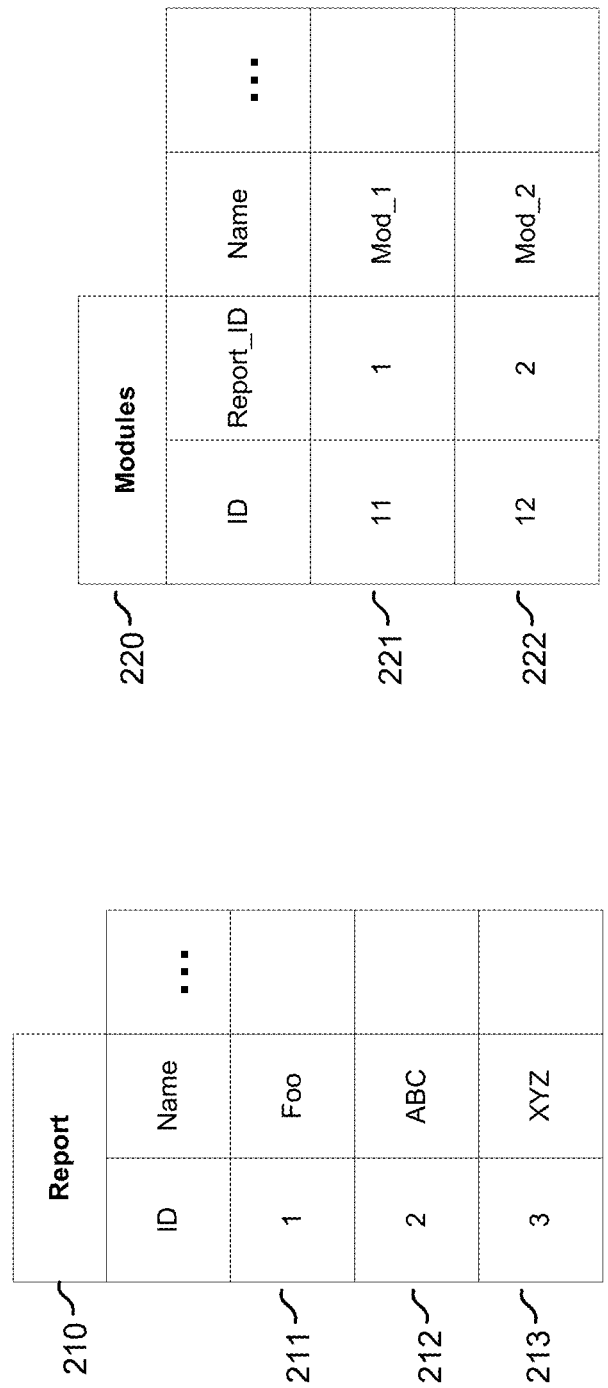
FIG. 2A is a diagram showing an embodiment of existing data sets that do not support draft modifications.

FIG. 2A is a diagram showing an embodiment of existing data sets that do not support draft modifications. A report data set 210 and modules data set 220 are shown in the example. Report data set 210 shows an example of a report that includes entries (rows) 211, 212, and 213. Each entry has one or more values associated with the entry. In the example shown, an entry of report data set 210 has an ID value, a name value, and one or more additional values indicated as " . . . ," which are not shown in further detail. The ID value is a reference value that allows other data sets to refer to a specific entry of report data set 210. The name value is a value associated with the entry. For example, the name value can refer to the name of an employee, a company, department, group, etc.

Modules data set 220 shows examples of modules that include entries 221 and 222. In the example shown, an entry of the modules data set 220 can have an ID value, a report_ID value, a name value, and one or more additional values represented as " . . . ," which are not shown in further detail. The ID value is a reference value that allows other data sets to refer to a specific entry of modules data set 220. In the example shown, the report_ID value (i.e., foreign key reference) is a value that references a specific entry of report data set 210. An entry in the modules data set can have one or more values that reference entries of other data sets. The name value is a value associated with the entry. For example, the name value can refer to the name of a module such as a graph, a chart, a dashboard, etc.

Figure 2B:
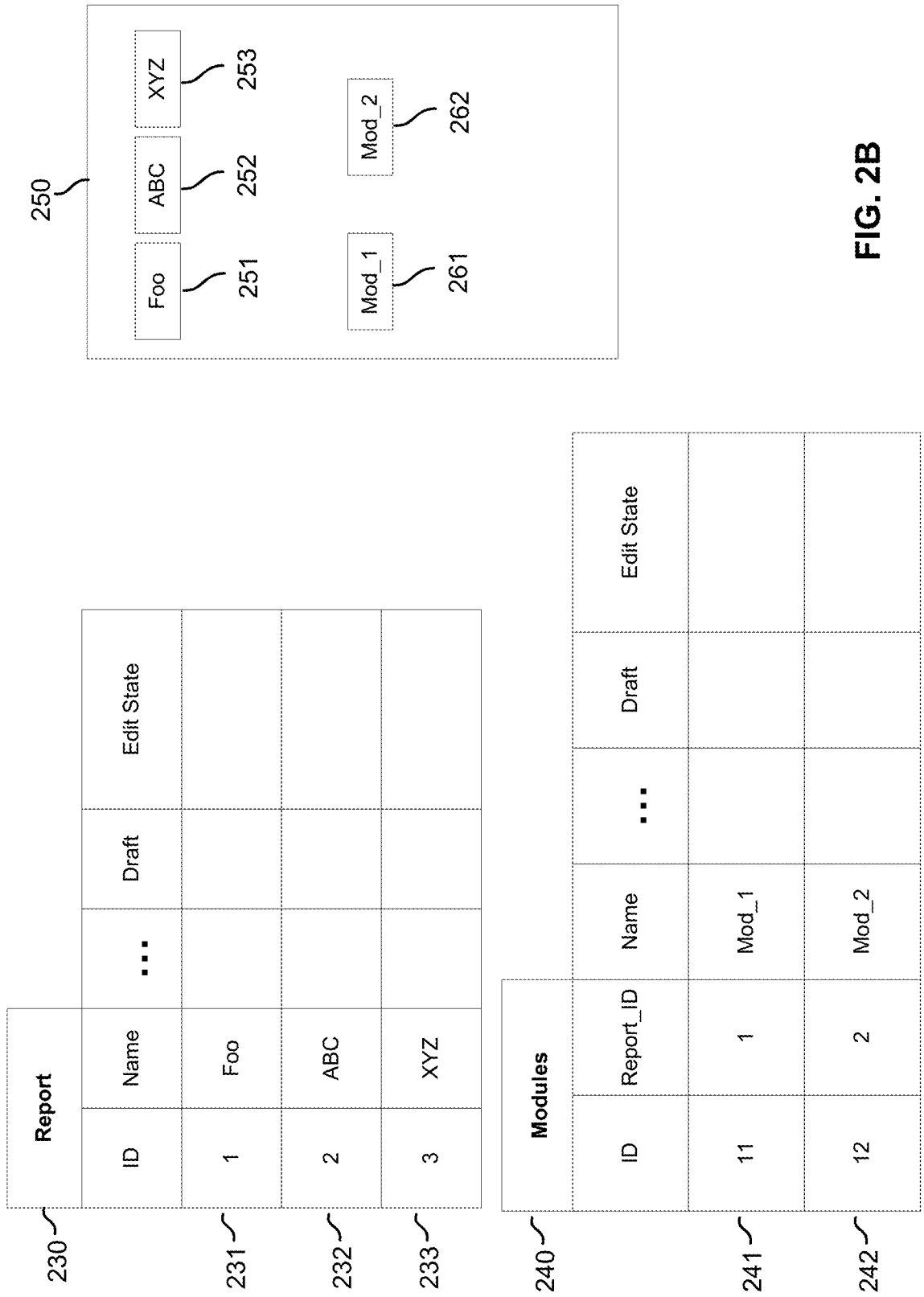
FIG. 2B is a diagram showing an embodiment of data sets that have been modified to support draft modifications and an associated rendered user interface.

FIG. 2B is a diagram showing an embodiment of data sets that have been modified to support draft modifications and an associated rendered user interface. In the example shown, report data set 230 and a modules data set 240 have been modified to include a draft column and an edit state column and are capable of being modified through the use of draft entries. The draft value and an edit state value are added to the data set to facilitate the management of modifications to the data set. The draft value is a value that points to another entry of the data set. As will be described herein, a draft entry is created and added to the data set when an entry is to be edited, deleted from the data set, or added to the data set. The draft value of the entry to be edited or deleted has a value of the draft entry ID value. The edit state value indicates a current state of the entry, such as published, published and subject to modification, published and subject to deletion, or new entry.

In some embodiments, an entry can have an edit state value of "Created_Draft," "Published_Has_Updated_ Draft," "Updated_Draft," "Published_Has_Deleted_Draft," "Deleted_Draft," "Published_No_Draft," or a null (blank state).

An existing entry can have a default edit state value of "Published_No_Draft." This state indicates that no modifications are being made to the entry. To reduce the overhead in maintaining the data set and the amount of memory required to store the data set, the entry can have a default edit state value of null.

A data set can be modified to include a new entry. A new entry is initially created as a draft entry and remains a draft entry until it is approved (i.e., commit and publish) by a user with approval privileges (e.g., an edit user or an administrator user). The draft entry has an edit state value of "Created_Draft."

The data set may also be modified to update an existing entry. The existing entry has an edit state value of "Published_Has_Updated_Draft" when one or more values of the entry are modified. A corresponding draft entry is created and the corresponding draft entry has an edit state value of "Updated_Draft." The draft value of the existing entry is updated to be the ID value of the corresponding draft entry.

The data set may also be modified to delete an existing entry. The existing entry to be deleted has an edit state value of "Published_Has_Deleted_Draft." A corresponding draft entry is created and the corresponding draft entry has an edit state value of "Deleted_Draft." The draft value of the existing entry is updated to be the ID value of the corresponding draft entry.

Report data set 230 shows an example of a report that includes entries 231, 232, and 233. Report data set 230 is similar to report data set 210 except that the entries have an associated draft value and edit state value.

Modules data set 240 shows an example of modules that include entries 241, 242. Modules data set 240 is similar to modules data set 220 except that the entries have an associated draft value and edit state value. The report_ID value always references the ID value of a published entry of a data set and does not reference the ID value of a draft entry of a data set. In the example shown, the report_ID value of entry 241 references the ID value of entry 231, a published entry. An entry is a published entry in the event the associated edit state value is a null value or "Published_No_Draft." An entry in the modules data set can have one or more values that reference entries of other data sets. The name value is a value associated with the entry. For example, the name value can refer to the name of a module such as a graph, a chart, a dashboard, etc. The draft value is a value that points to another entry of the data set.

A rendered UI can depict any of the entries of the data sets based on application context on a display shown to the user. In the example shown, rendered UI 250 depicts the entries associated with report data set 230 and modules data set 240. Items 251, 252, 253 are portions of the UI that correspond to entries 231, 232, 233, respectively. In the example shown, the UI displays a name value associated with each entry. The UI can display other entry values associated with the entries or a combination of the name value and one or more other entry values associated with the entries.

Items 261, 262 are portions of the UI that correspond to entries 241, 242, respectively. In the example shown, the UI displays a name value associated with each entry. The UI can display other entry values associated with the entries or a combination of the name value and one or more entry values associated with the entries. The UI can render a module based on an associated data set as a chart, a graph, a dashboard, etc. The module data set can reference another data set. When rendered by the UI, the rendered module can be based on one or more values of the referenced data set.

Figure 3:
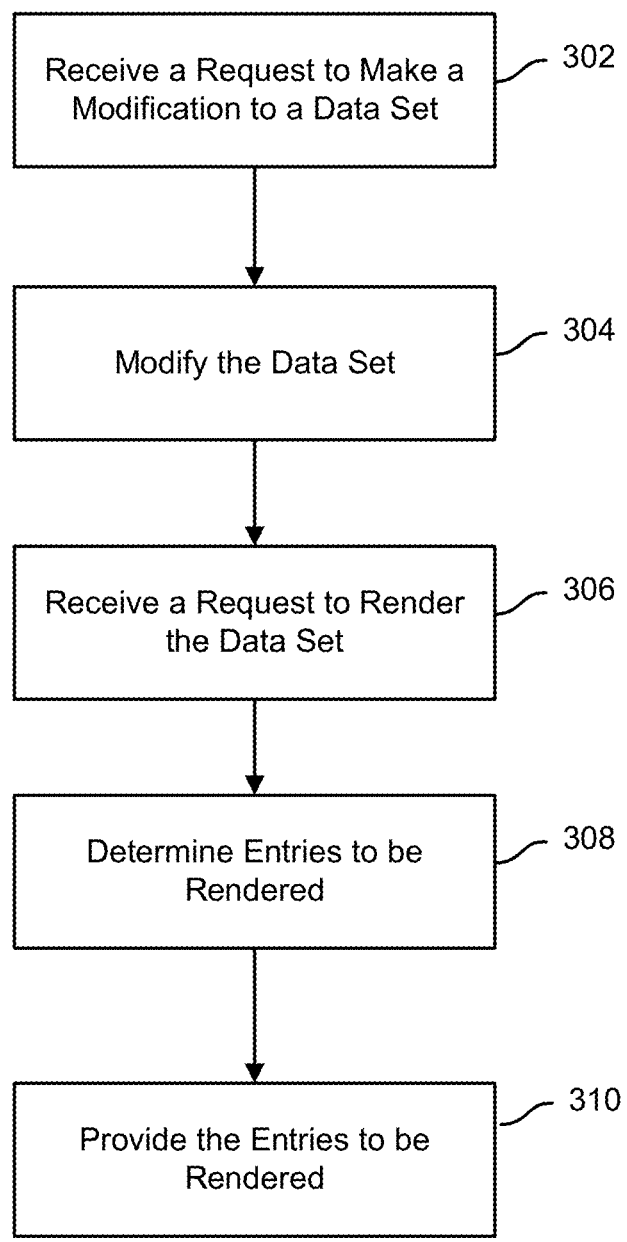
FIG. 3 is a flow chart illustrating an embodiment of a process to manage modifications to a data set.

FIG. 3 is a flow chart illustrating an embodiment of a process to manage modifications to a data set. In some embodiments, the process 300 of FIG. 3 is executed using an ORM, such as ORM 130.

At 302, a request to modify a data set is received. The request is initiated by a user input made via the UI layer, which invokes one or more application programming interface (API) calls that package the data according to a predetermined format, and transmit the packaged data to the ORM, which receives and processes the data. The request can be a request to create an entry to the data set, a request to edit one or more values of an entry of the data set, or a request to delete an entry of the data set.

At 304, the data set is modified based on the modification request.

In the event the request to modify the data set is a request to create an entry to the data set, a draft entry is created and added to the data set. One or more values associated with the draft entry are received and stored to the data set. The edit state value of the draft entry is updated to have a value of "Created_Draft."

In the event the request to modify the data set is a request to edit one or more values of an entry of the data set, a draft entry is created and added to the data set. A draft value associated with the entry to be edited is updated to be the ID value of the draft entry. The edit state value of the entry to be edited is updated to be "Published_Has_Updated_Draft." One or more values associated with the draft entry are received and stored to the data set. The edit state value of the draft entry is updated to have a value of "Updated_Draft." In some embodiments, the one or more values associated with the entry to be edited are copied to the draft entry and one or more edited values of the draft entry are received and stored to the data set.

In the event the request to modify the data set is a request to delete an entry of the data set, a draft entry is created and added to the data set. A draft value associated with the entry to be deleted is updated to be the ID value of the draft entry. The edit state value of the entry to be deleted is updated to be "Published_Has_Deleted_Draft." The edit state value of the draft entry is updated to be "Deleted_Draft."

At 306, a request to render the data set is received. The request is inputted by a user (e.g., a regular user, an edit user, or an administrator user) via the UI layer and received via an API between the UI layer and the ORM.

At 308, the entries to be rendered are determined based on the request to render the data set. In the event the request to render the data set is received from a regular user, it is determined to render a published version of the data set. For example, entries with an edit state of null or "Published_No_Draft" are included in the data set. An entry can have an edit state value of "Published_Has_Updated_Draft" and an associated draft entry with one or more edited values. The data set will be rendered to include the one or more values associated with the entry with an edit state value of "Published_Has_Updated_Draft," but will not include one or more values associated with the draft entry. An entry can have an edit state value of "Published_Has_Deleted_Draft" and an associated draft entry. The data set will be rendered to include the one or more values associated with the entry with an edit state value of "Published_Has_Deleted_Draft," but will not include one or more values associated with the draft entry. An entry can have an edit state value of "Created_Draft." The rendered data set will not include one or more values associated with an entry with an edit state value of "Created_Draft."

In the event the request to render the data set is received from an administrator user or edit user, a published version of the data set or a preview version of the data set can be rendered. An indication from the administrator or edit user is received via the UI layer as to whether to render a published version of the data set or a preview version of the data set.

In the event the indication indicates that a published version of the data set should be rendered, the data set is rendered as described above with respect to a regular user.

In the event the indication indicates that a preview version of the data set should be rendered, the entries to include in the data set are determined based on the edit state value of the entries. For example, in the event the edit state value associated with an entry is null or "Published_No_Draft," the entry is not subject to modification and is determined to be included in the rendered data set.

In the event the entry has an edit state value of "Published_Has_Updated_Draft," the entry is determined to be excluded from the rendered data set and the entry to include in place of the entry to be edited is determined based on a draft value associated with the entry to be edited. The edit state value of the entry referenced by the draft value is reviewed to determine whether to include the draft entry in the rendered data set. In the event the draft entry has an edit state value of "Updated_Draft," the draft entry is determined to be included in the rendered data set.

In the event the entry has an edit state value of "Published_Has_Deleted_Draft," a draft value associated with the entry to be deleted is determined. The edit state value of the entry referenced by the draft value associated with the entry to be deleted is reviewed. In the event the draft entry has an edit state value of "Deleted_Draft," the entry to be deleted is determined to be excluded from the rendered data set.

In the event the entry has an edit state value of "Created_Draft," the ORM determines that the entry should be included in the rendered data set.

At 310, the entries to be rendered are provided to the UI layer, which in turn renders the data set to a user via a UI. Referring to the example shown in FIG. 2B, the UI may render a first data set (e.g., modules data set 240) that references a second data set (e.g., report data set 230). The first data set will be rendered based on one or more values of the second data set. In the event an entry of the first data set references an entry of the second data set that no longer exists, that entry will not be rendered.

Figure 4:
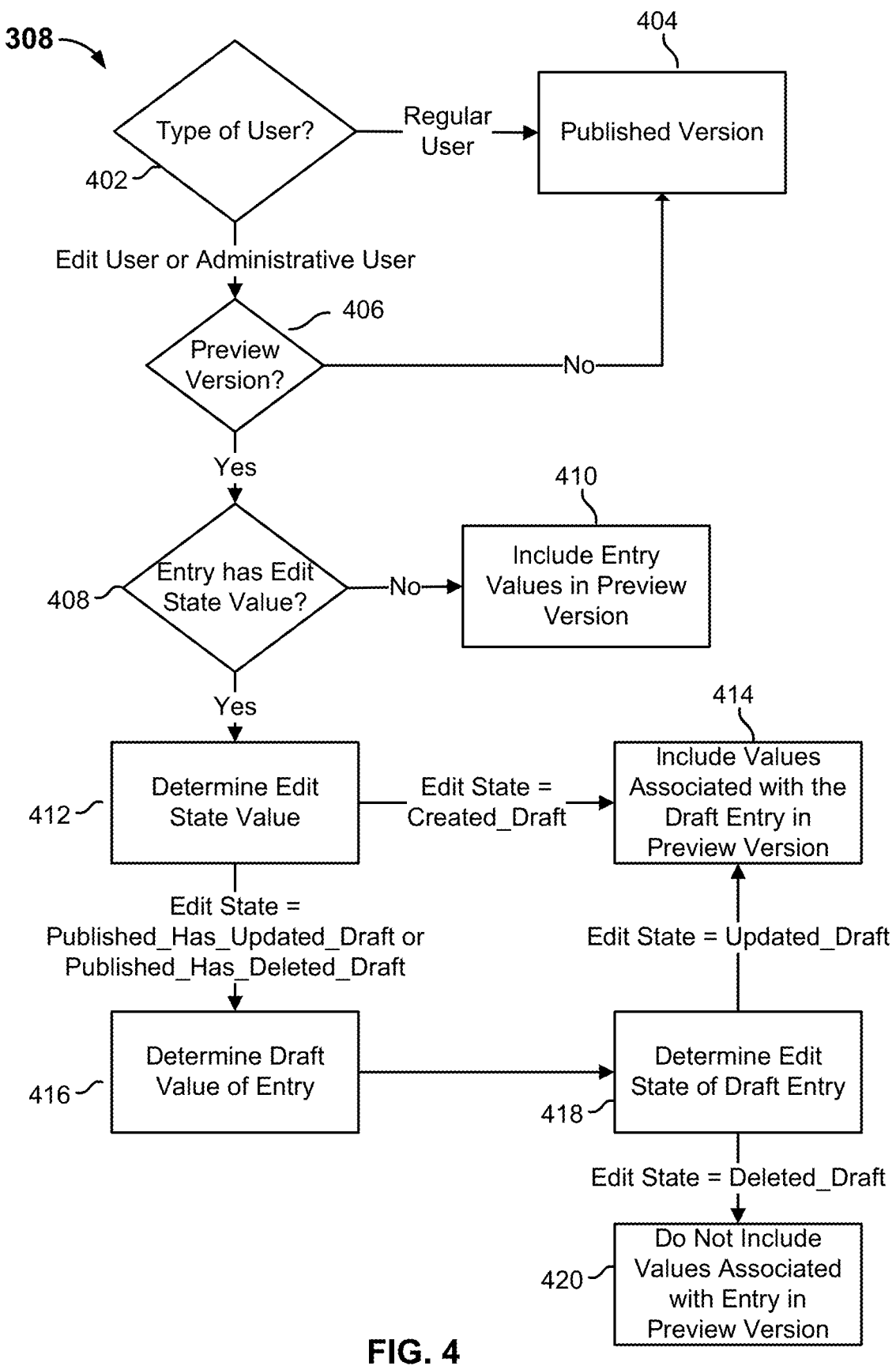
FIG. 4 is a flow chart illustrating an embodiment of a process to determine which entries are to be rendered.

FIG. 4 is a flow chart illustrating an embodiment of a process to determine which entries are to be rendered. In some embodiments, the process of FIG. 4 is executed by an object relational mapper, such as ORM 130. In some embodiments, the process of FIG. 4 is implemented to perform step 308 of FIG. 3.

At 402, a type of user attempting to view the data set is determined. The user logs in via a UI to view the data set. Based on the user login credentials, it is determined whether the user is a regular user, an edit user, or an administrator user. In some embodiments, the user login credentials can be compared to a database of login credentials and associated user privileges. In the event the type of user is determined to be a regular user, the process proceeds to 404. In the event the type of user is determined to be an edit user or administrator user, the process proceeds to 406.

At 404, the entries to be rendered in a published version of the data set are determined. Entries that have an edit state value of "Published_No_Draft" or a null (empty) state indicate that the one or more values associated with the entries have already been published and are included in the published version of the data set. Entries that have an edit state value of "Published_Has_Updated_Draft" or "Published_Has_Deleted_Draft" indicate that the entry is an entry to be modified. The draft entry associated with the entry to be modified and the draft entry's associated values are ignored. Instead, the one or more values of the entry to be modified are determined to be rendered in the published version of the data set. Entries that have an edit state value of "Created_Draft" indicate that the entries are draft entries and are determined to be excluded from the published version of the data set.

At 406, an indication that indicates whether to render a published version of the data set or a preview version of the data set is received via the UI layer. In the event the indication indicates to render a published version of the data set, the process proceeds to 404. In the event the indication indicates to render a preview version of the data set, the process proceeds to 408.

At 408, for an entry that is to be rendered in the preview version of the data set, it is determined whether the entry has an associated edit state value. In the event the entry does not include an edit state value (i.e., null), the process proceeds to 410 and the one or more values associated with the entry are included in the preview version of the data set. In the event the entry includes an edit state value, the process proceeds to 412.

At 412, an edit state value associated with the entry is determined. In the event the edit state value is "Created_Draft," the process proceeds to 414 and the entry is determined to be a draft entry, and the one or more values associated with the draft entry are included in the preview version of the data set. In the event the edit state value is "Published_Has_Updated_Draft" or "Published_Has_Deleted_Draft," the process proceeds to 416.

At 416, a draft value associated with the entry is determined and the process proceeds to 418. The draft value references an ID value of a draft entry.

At 418, the draft entry with an ID value that is equal to the draft value of the entry is analyzed to determine an edit state of the draft entry. In the event the edit state of the draft entry is "Updated_Draft," the process proceeds to 414 and the one or more values associated with the draft entry are determined to be included in the preview version of the data set.

In the event the edit state of the draft entry is "Deleted_Draft," the process proceeds to 420 and the values associated with the entry to be deleted are determined to be excluded from the preview version of the data set.

Figure 5:
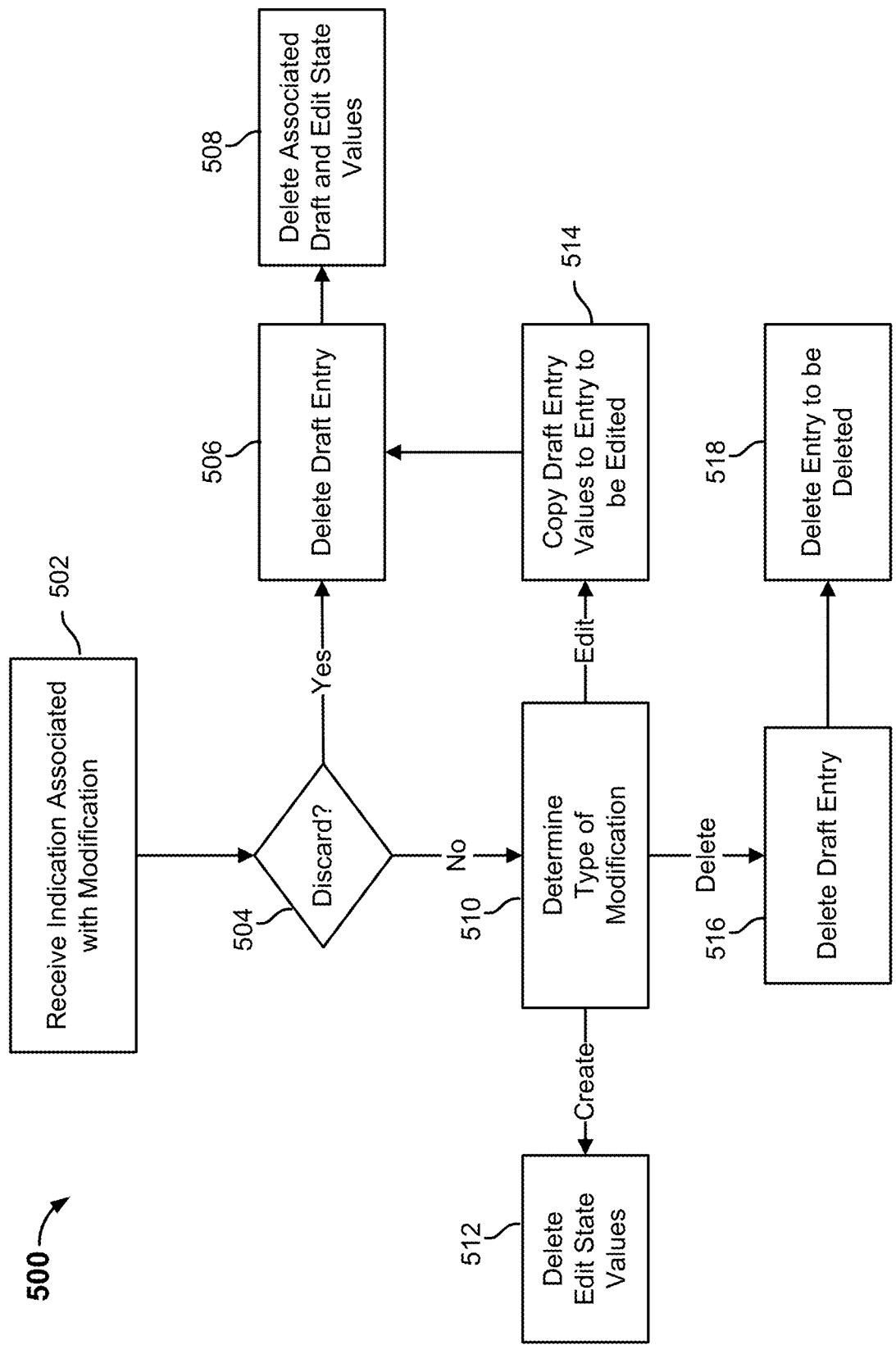
FIG. 5 is a flowchart illustrating an embodiment of a process to manage modifications to a data set.

FIG. 5 is a flowchart illustrating an embodiment of a process to manage modifications to a data set. In some embodiments, the process 500 of FIG. 5 is executed using an ORM, such as ORM 130.

At 502, an indication, for each entry subject to modification, is received via the UI layer as to whether a modification to an entry is to be committed to the data set or discarded from the data set. A user with approval privileges (e.g., an edit user or an administrator user) via the UI may indicate whether to commit or discard the modification.

At 504, it is determined whether to discard or commit the modification based on the indication. In the event the indication indicates to discard the modification, the process proceeds to 506. In the event the indication indicates to commit the modification, the process proceeds to 510.

At 506, an edit state value associated with the entry is determined to see if the entry should be deleted. In the event the edit state value is "Created_Draft," the draft entry is deleted from the data set. In the event the edit state value is "Published_Has_Updated_Draft" or "Published_Has_Deleted_Draft," a draft value of the entry is determined to identify a draft entry associated with the entry. The draft value of the entry references an ID value of a draft entry associated with the entry. Upon determining the associated draft entry, the associated draft entry from the data set is deleted and the process proceeds to 508. This reduces the overhead in maintaining the data set and the memory size of the data set because the data set no longer includes the draft entry and associated draft and edit state values.

At 508, the draft value and the edit state value associated with the entry are deleted. This reduces the overhead in maintaining the data set and the memory size of the data set because the data set no longer includes the draft value and edit state value of the entry.

At 510, the type of modification to the entry is determined based on the edit state value of the entry. In the event the edit state value is "Created_Draft," the process proceeds to 512 and the edit state value of the entry is deleted from the data set. In the event the edit state is "Published_Has_Updated_Draft," the process proceeds to 514 and the one or more values of the associated draft entry are copied to the entry. Subsequently, the process proceeds to 506. In the event the edit state value is "Published_Has_Deleted_Draft," the process proceeds to 516 and the draft entry is deleted from the data set. The process proceeds to 518 and the entry with an edit state value of "Published_Has_Deleted_Draft" is deleted from the data set.

FIG. 6A is a diagram illustrating example data sets that include an entry to be edited. The modifications to the data sets depicted in FIG. 6A can be performed by an ORM, such as ORM 130.

In the example shown, the report data set 610 comprises an entry 611 that includes a value to be edited. The name value of entry 611 is to be edited from "Foo" to "Bar." To change the name value of entry 611, a draft entry 614 is created. There can be different ways to edit values via draft entries. In some embodiments, the one or more values associated with an entry are automatically copied to the one or more corresponding values associated with the draft entry and edits are made to one or more selected values associated with draft entry 614. In other embodiments, the one or more values associated with draft entry 614 are entered manually by a user and received via the UI layer. A draft value of entry 611 is updated to reference the ID value of the draft entry 614. In the example shown, the draft value of entry 611 (which has an ID of 1) is updated to "4" to indicate that the entry with the ID of 4 is used to store the updates for this entry. The edit state value of entry 611 is also updated to "Published_Has_Updated_Draft," which indicates that entry 611 is to be edited. The edit state value of draft entry 614 is updated to "Updated_Draft," which indicates that the values of the draft entry 614 have not yet been published.

The modules data set 620 also comprises an entry 621 that includes a value to be edited. Edits to the modules data set are performed by the ORM in a similar manner as edits to the report data set. In the example shown, the name value of entry 621 is to be edited from "Mod_1" to "Mod_A." To change the name value of entry 621, a draft entry 623 is created. A draft value of entry 621 is updated to reference the ID value of the draft entry 623. In the example shown, the draft value of entry 621 (which has an ID of 11) is updated to "13" to indicate that the entry with the ID of 13 is used to store the updates for this entry. The edit state value of entry 621 is also updated to "Published_Has_Updated_Draft," which indicates that entry 621 is to be edited. The edit state value of draft entry 623 is updated to "Updated_Draft," which indicates that the values of the draft entry 623 have not yet been published.

Figure 6B:
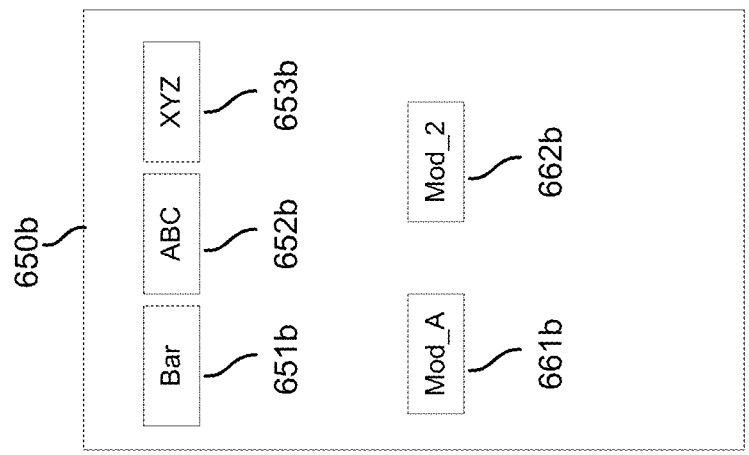
FIG. 6B is a diagram illustrating an example UI in a published mode and a preview mode.
Figure 6B:
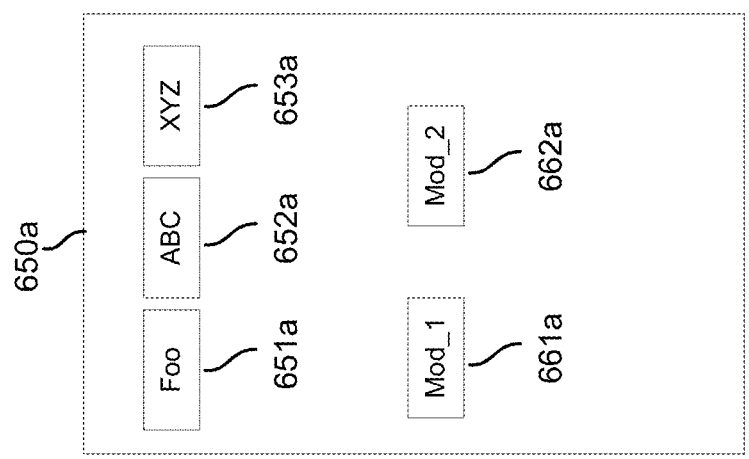

FIG. 6B is a diagram illustrating an example UI in a published mode and a preview mode. In the example shown, the UI is rendered using stored data sets, such as data sets 610 and 620. FIG. 6B depicts a published version 650a of the data set and a preview version 650b of the data set. The published version 650a of the data set only renders published entries. The preview version 650b of the data set renders values associated with published entries not being edited and one or more values associated with draft entries.

The published version 650a of the data set is rendered based on the edit state value of the entries. For example, an entry in the data set can have an edit state value of a null (empty) state, "Published_No_Draft," "Published_Has_Updated_Draft," or "Published_Has_Deleted_Draft." These states indicate that the one or more values associated with the entry have already been published and should be included in the published version 650a of the data set. An edit state value of "Created_Draft," "Updated_Draft," or "Deleted_Draft" indicates that the one or more values associated with the entry have not already been published and should not be included in the published version 650a of the data set. In the example shown, items 651a, 652a, 653a correspond to the name values associated with entries 611, 612, and 613, respectively. Items 661a and 662a correspond to the name values associated with entries 621 and 622, respectively.

The preview version 650b of the data set is also rendered based on the edit state value of the entries. For example, an entry in the data set can have an edit state value of a null (empty) state or "Published_No_Draft." These states indicate that the one or more values associated with the entry have already been published, are not subject to modification, and should be included in the preview version 650b of the data set. Draft states "Published_Has_Updated_Draft" or "Published_Has_Deleted_Draft" indicate that the one or more values associated with the entry have already been published, are subject to modification, and should not be included in the preview version 650b of the data set. An edit state value of "Created_Draft" or "Updated_Draft" indicates that the one or more values associated with the entry have not already been published and should be included in the preview version 650b of the data set in place of their corresponding published entries. An edit state value of "Deleted_Draft" indicates that the one or more values associated with the entry to be deleted should be excluded in the preview version 650b of the data set. In the example shown, items 651b, 652b, 653b correspond to the name values associated with entries 614, 612, and 613, respectively. Items 661b and 662b correspond to the name values associated with entries 623 and 622, respectively.

FIG. 6C is a diagram illustrating example data sets that include edits that have been committed. The modifications to the data sets depicted in FIG. 6C can be performed by an ORM, such as ORM 130. In the example shown, an indication that the edits depicted in FIG. 6A should be committed is received. In response to the indication, draft entry 614 is removed from the report data set 610, draft value of entry 611 is changed from "4" to a null value, the edit state value of entry 611 is changed from "Published_Has_Updated_Draft" to a null value, and the name value of entry 611 is changed from "Foo" to "Bar." This reduces the overhead in maintaining the data set and the memory size of the data set because the data set no longer includes the draft entry and associated draft and edit state values.

Draft entry 623 is also removed from the modules data set 620, the draft value 635 of entry 621 is changed from "13" to a null value, the edit state of entry 621 is changed from "Published_Has_Updated_Draft" to a null value, and the name value of entry 621 is changed from "Mod_1" to "Mod_A." This reduces the overhead in maintaining the data set and the memory size of the data set because the data set no longer includes the draft entry and associated draft and edit state values.

FIG. 7A is a diagram illustrating example data sets that include an entry to be added to the data set. The modifications to the data sets depicted in FIG. 7A can be performed by an ORM, such as ORM 130. In the example shown, entry 714 is a draft entry that is created and added to the report data set 710. The edit state value of entry 714 is updated to "Created_Draft," which indicates that entry 714 is to be added to the data set.

The modules data set 720 also comprises an entry 723 that is to be added to the modules data set 720. Edits to the modules data set are performed by the ORM in a similar manner as edits to the report data set. In the example shown, entry 723 is a draft entry that is added to the modules data set 720. The edit state value of entry 723 is updated to "Created_Draft," which indicates that entry 723 is to be added to the data set.

Figure 7B:
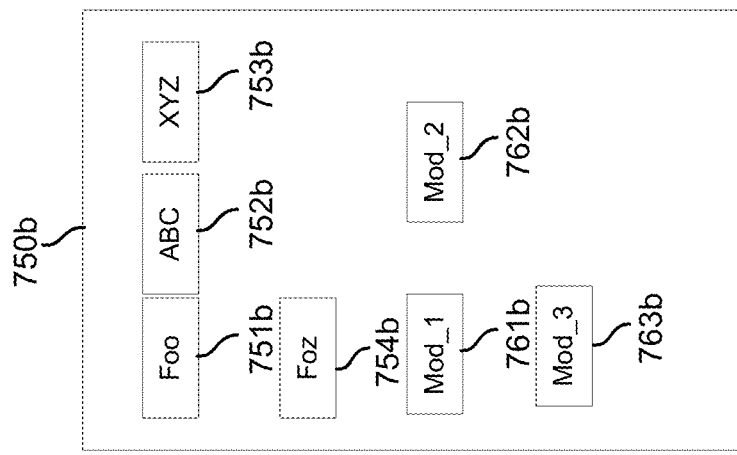
FIG. 7B is a diagram illustrating an example of a UI in a published mode and a preview mode.
Figure 7B:
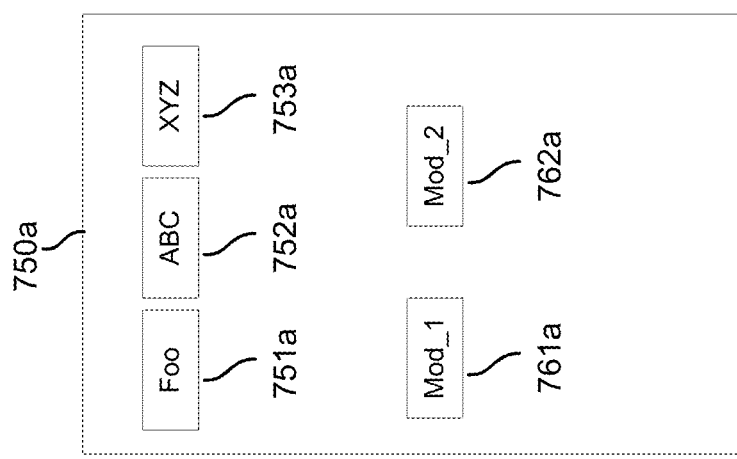

FIG. 7B is a diagram illustrating an example of a UI in a published mode and a preview mode. In the example shown, the UI is rendered using stored data sets, such as data sets 710 and 720. FIG. 7B depicts a published version 750a of the data set and a preview version 750b of the data set. The published version 750a of the data set only renders published entries. The preview version 750b of the data set renders one or more values associated with published entries not being edited and one or more values associated with draft entries.

The published version 750a of the data set is rendered based on the edit state value of the entries. For example, an entry in the data set can have an edit state value of a null (empty) state, "Published_No_Draft," "Published_Has_Updated_Draft," or "Published_Has_Deleted_Draft." These states indicate that the one or more values associated with the entry have already been published and should be included in the published version 750a of the data set. An edit state value of "Created_Draft," "Updated_Draft," or "Deleted_Draft" indicates that the one or more values associated with the entry have not yet been published and should not be included in the published version 750a of the data set. In the example shown, items 751a, 752a, 753a correspond to the name values associated with entries 711, 712, and 713, respectively. Items 761a and 762a correspond to the name values associated with entries 721 and 722, respectively. The one or more values associated with entries 714 and 723 are not included in the rendered UI because those entries have an edit state of "Created_Draft."

The preview version 750b of the data set is also rendered based on the edit state value of the entries. For example, an entry in the data set can have an edit state value of a null (empty) state or "Published_No_Draft." These states indicate that the one or more values associated with the entry have already been published, are not subject to modification, and should be included in the preview version 750b of the data set. Draft states "Published_Has_Updated_Draft" or "Published_Has_Deleted_Draft" indicate that the one or more values associated with the entry have already been published, are subject to modification, and should not be included in the preview version 750b of the data set. An edit state value of "Created_Draft" or "Updated_Draft" indicates that the one or more values associated with the entry have not already been published and should be included in the preview version 750b of the data set in place of their corresponding published entries. An edit state value of "Deleted_Draft" indicates that the one or more values associated with the entry to be deleted should be excluded in the preview version 750b of the data set. In the example shown, items 751b, 752b, 753b, 754b correspond to the name values associated with entries 711, 712, 713, and 714, respectively. Items 761b, 762b, 763b correspond to the name values associated with entries 721, 722, and 723, respectively. Items 754b and 763b are included in the preview version of the data set because their corresponding edit state values are "Created_Draft."

FIG. 7C is a diagram illustrating example data sets that include edits that have been committed. The modifications to the data sets depicted in FIG. 7C can be performed by an ORM, such as ORM 130. In the example shown, an indication that the edits of FIG. 7A should be committed is received. In response to the indication, the draft entries 714, 723 are converted into published entries by changing the edit state values of entries 714 and 723 from "Created_Draft" to a null value. This reduces the overhead in maintaining the data set and the memory size of the data set because the draft entry no longer has an associated edit state value.

FIG. 8A is a diagram illustrating example data sets that include an entry that is to be deleted. The modifications to the data sets depicted in FIG. 8A can be performed by an ORM, such as ORM 130. In the example shown, report data set 810 comprises an entry 811 that is to be deleted. A draft entry 814 is created. In some embodiments, the one or more values associated with an entry to be deleted are automatically copied to the one or more corresponding values associated with the draft entry. In other embodiments, the one or more values associated with draft entry 814 are entered manually. A draft value of entry 811 is updated to reference the ID value of the draft entry 814. In the example shown, the draft value of entry 811 (which has an ID of 1) is updated to "4" to indicate that the entry with the ID of 4 is used to store updates for this entry. The edit state value of entry 811 is also updated to "Published_Has_Deleted_Draft," which indicates that entry 811 is to be deleted. The edit state value of draft entry 814 is also updated to "Deleted_Draft," which indicates that the deletion of entry 811 has not yet been committed and published.

The modules data set 820 also comprises entries 821, 822 that are not subject to modification. In the example shown, entries 821, 822 have Report_ID values of "1," "2," which reference entries 811, 812, respectively. When modules associated with entries 821, 822 are rendered by the UI, they will be rendered using one or more values associated with entries 811, 812, respectively. In the event an entry from the modules data set references an entry from another data set that no longer exists in the other data set, the UI will be unable to render the module. For example, entry 821 has a Report_ID value of "1," which references entry 811 of Report Data set 810. Entry 811 is to be deleted because it has an edit state of "Published_Has_Deleted_Draft." In a preview mode of the data sets, the UI will not render entry 821, even though its edit state value indicates that the entry should be published, because entry 821 references an entry from another data set that is subject to deletion.

Figure 8B:
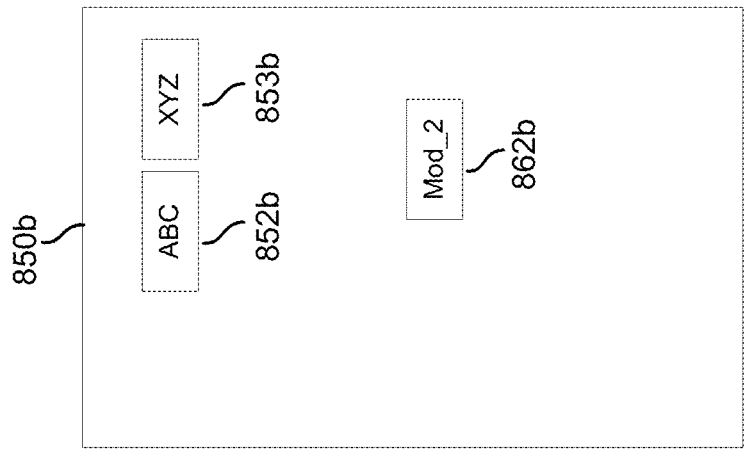
FIG. 8B is a diagram illustrating an example UI in a published mode and a preview mode.
Figure 8B:
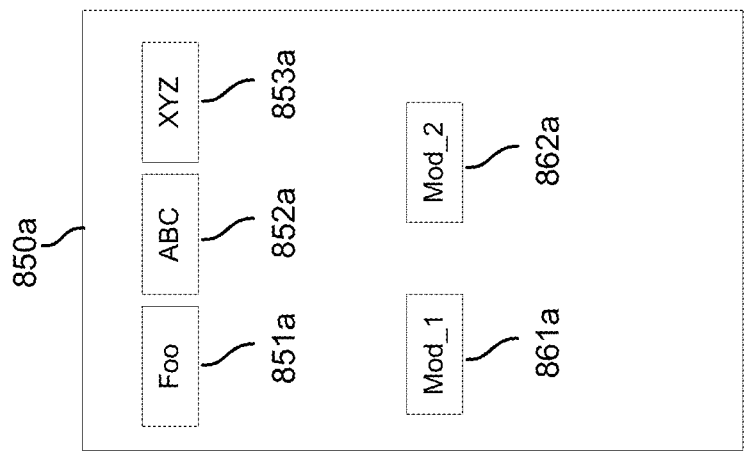

FIG. 8B is a diagram illustrating an example UI in a published mode and a preview mode. In the example shown, the UI can be rendered using stored data sets, such as data sets 810 and 820. FIG. 8B depicts a published version 850a of the data set and a preview version 850b of the data set. The published version 850a of the data set only renders published entries. The preview version 850b of the data set renders one or more values associated with published entries not being edited and one or more values associated with draft entries.

The published version 850a of the data set is rendered based on the edit state value of the entries. For example, an entry in the data set can have an edit state value of a null (empty) state, "Published_No_Draft," "Published_Has_Updated_Draft," or "Published_Has_Deleted_Draft." These states indicate that the one or more values associated with the entry have already been published and should be included in the published version 850a of the data set. An edit state value of "Created_Draft," "Updated_Draft," or "Deleted_Draft" indicates that the one or more values associated with the entry have not already been published and should not be included in the published version 850a of the data set. In the example shown, items 851a, 852a, 853a correspond to the name values associated with entries 811, 812, and 813, respectively. Items 861a and 862a correspond to the name values associated with entries 821 and 822, respectively.

The preview version 850b of the data set is also rendered based on the edit state value of the entries. For example, an entry in the data set can have an edit state value of a null (empty) state or "Published_No_Draft." These states indicate that the one or more values associated with the entry have already been published, are not subject to modification, and should be included in the preview version 850b of the data set. Draft states "Published_Has_Updated_Draft" or "Published_Has_Deleted_Draft" indicate that the one or more values associated with the entry have already been published, are subject to modification, and should not be included in the preview version 850b of the data set. An edit state value of "Created_Draft" or "Updated_Draft" indicates that the one or more values associated with the entry have not already been published and should be included in the preview version 850b of the data set in place of their corresponding published entries. An edit state value of "Deleted_Draft" indicates that the one or more values associated with the entry to be deleted should be excluded in the preview version 850b of the data set. In the example shown, items 852b and 853b correspond to the name values associated with entries 812 and 813, respectively. Item 862b corresponds to the name value associated with entry 822.

The one or more values associated with entry 811 are not rendered by the UI because entry 811 references a draft entry with an edit state of "Deleted_Draft." Module 821 is not rendered by the UI because it references entry 811. Since module 821 uses one or more values associated with 811 and the one or more values associated with 811 are to be deleted, then module 821 will not have the sufficient inputs necessary to function.

FIG. 8C is a diagram illustrating example data sets that include edits that have been committed. The modifications to the data sets depicted in FIG. 8C can be performed by an ORM, such as ORM 130. In the example shown, an indication that the deletion depicted in FIG. 8A should be committed is received. In response to the indication, entries 811, 814 are removed from the report data set 810. In some embodiments, an entry associated with a deleted entry is automatically removed from the data set. For example, entry 821 references deleted entry 811 and entry 821 is deleted. In some embodiments, an indication that an entry references a deleted entry is provided to a user via the UI layer. This reduces the overhead in maintaining the data set and the memory size of the data set because the data set no longer includes the entry that was deleted and the corresponding draft entry.

FIG. 9A is a diagram illustrating example data sets that are under review by an administrator user, but are being edited by an edit user. The modifications to the data sets depicted in FIG. 9A can be performed by an ORM, such as ORM 130. The data sets of FIG. 9A are similar to the data sets of FIG. 6A, except that draft entry 914 references another draft entry 915. In the example shown, draft entry 914 has a draft value of "5." The name value of entry 911 is to be edited from "Foo" to "Bar." To change the name value of entry 911, a draft entry 914 is created. At a later point in time before the edits made in draft entry 914 are committed by a user with approval privileges, such as an edit user or an administrator user, additional edits can be made to entry 911. In the example shown, the name of the entry is to be changed from "Foo" to "Foz" instead of "Foo" to "Bar." In other embodiments, draft entry 915 may include one or more other edits to entry 911 that were not edited by draft entry 914. For example, draft entry 915 may include one or more values " . . . " that are different than the corresponding one or more values " . . . " of entries 911, 914.

Figure 9B:
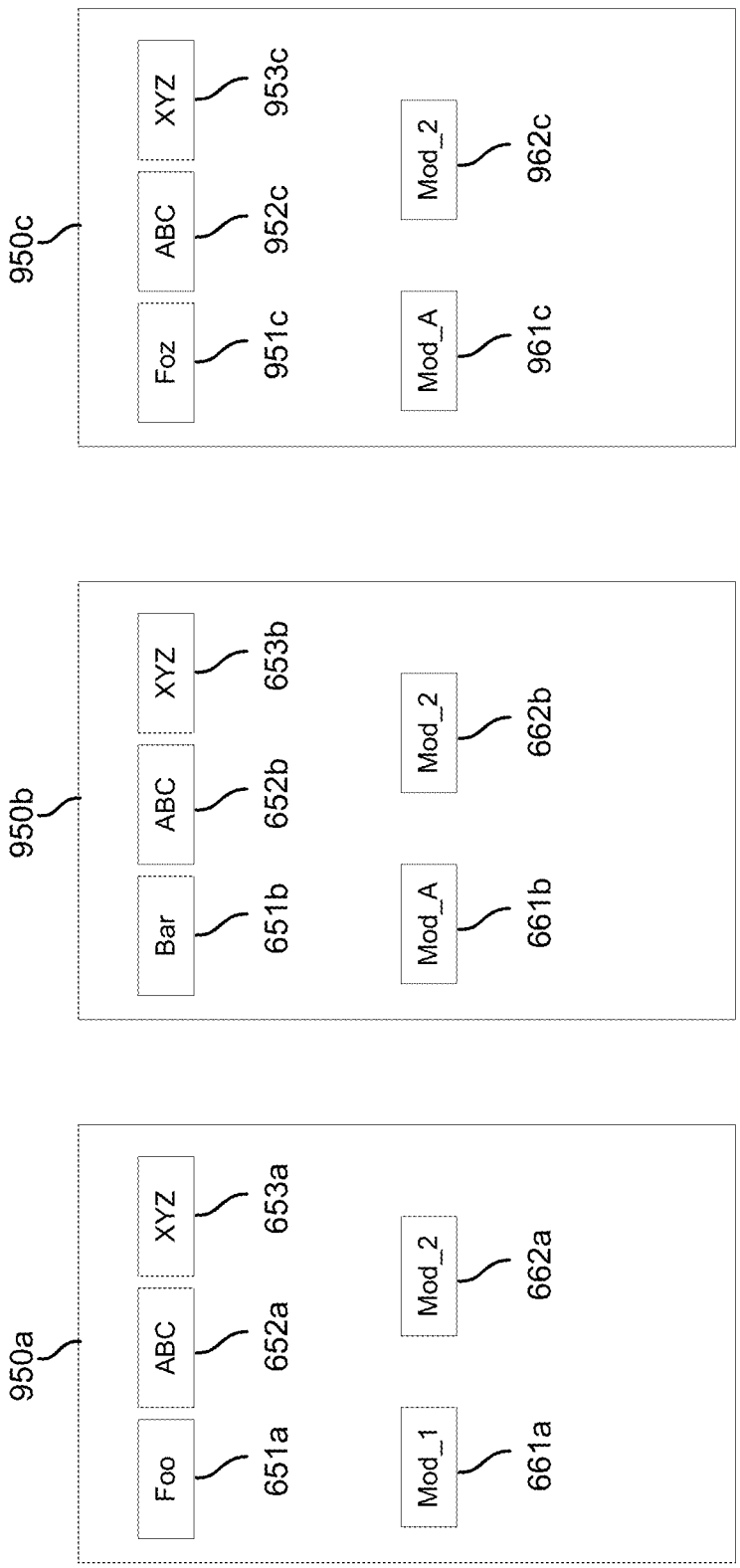
FIG. 9B is a diagram illustrating examples of a UI in a published mode and a preview mode.

FIG. 9B is a diagram illustrating examples of a UI in a published mode and a preview mode. In the example shown, the UI can be rendered using stored data sets, such as data sets 910 and 920. FIG. 9B depicts a published version 950a of the data set, a level one preview version 950b of the data set, and a level two preview version 950c. The published version 950a of the data set only renders published entries. The level one preview version 950b of the data set renders one or more values associated with published entries not being edited and one or more values associated with level one draft entries. A level one draft entry is a draft entry that is directly referenced by a published entry. The level two preview version 950c of the data set renders one or more values associated with published entries not being edited, one or more values associated with level one draft entries not referenced by a level two draft entry, and one or more values associated with level two draft entries. A level two draft entry is a draft entry that is not directly referenced by a published entry, but a draft entry that is referenced by another draft entry.

The published version 950a of the data set and level one preview version 950b of the data set correspond to published version 650a and preview version 650b of FIG. 6B.

The level two preview version 950c of the data set is rendered based on the edit state value and draft value of the entries. For example, entry 914 has an edit state value of "Updated_Draft" and a draft value of "5." Although entry 914 is a draft entry, if a draft entry has an associated draft value, a second draft entry of the first draft entry is determined to exist. When an indication to provide a level two preview version is received, it is determined that draft entry 915 should be included in the data set to be rendered instead of draft entry 914. In the example shown, items 951c, 952c, 953c correspond to the name values associated with entries 915, 912, and 913, respectively. Items 961c and 962c correspond to the name values associated with entries 921 and 922, respectively.

Figure 10:
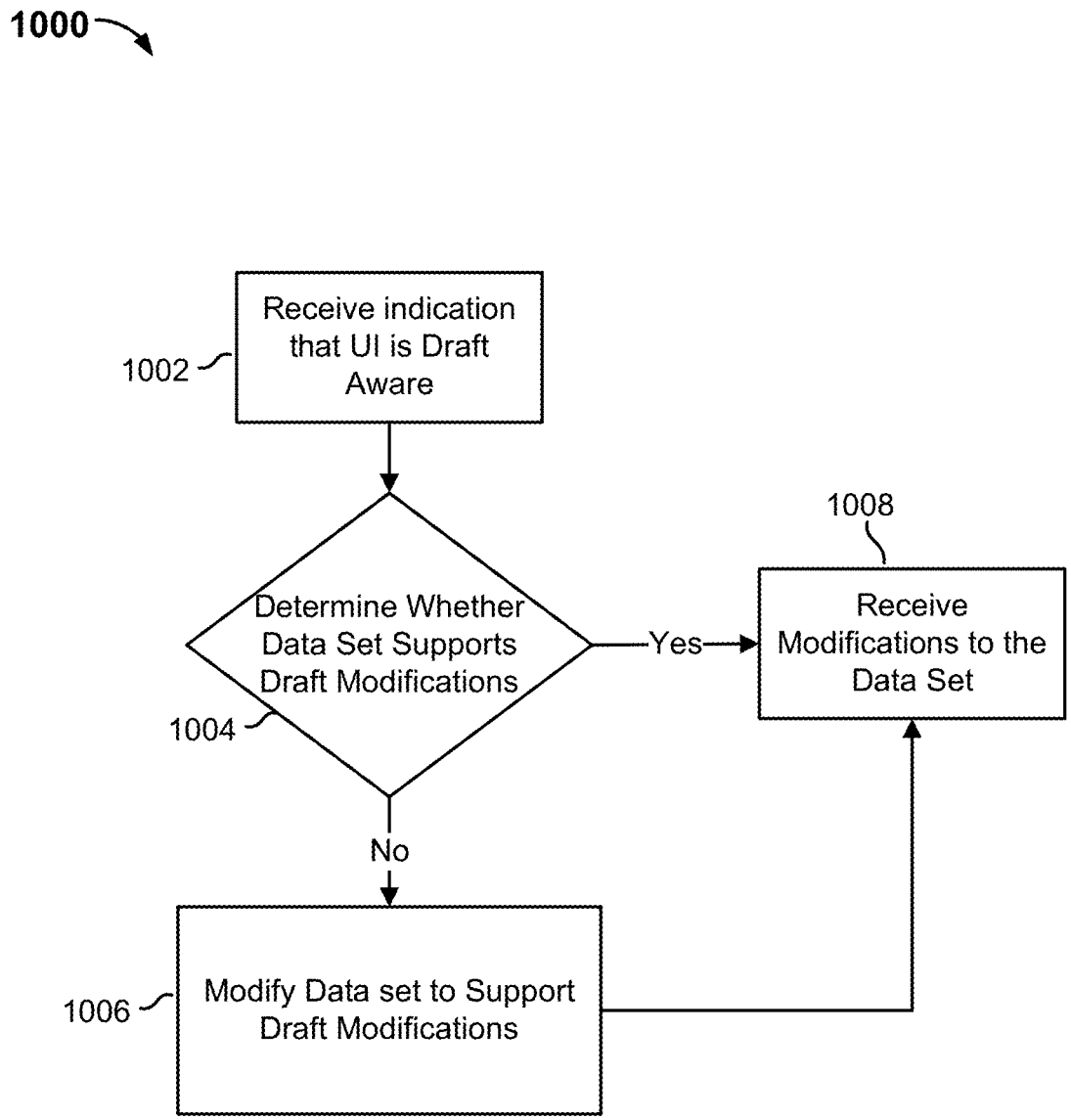
FIG. 10 is a flowchart depicting an example of a process of updating a legacy data set to be compatible with a database change management system.

FIG. 10 is a flowchart depicting an example of a process of updating a legacy data set to be compatible with a database change management system, such as system 100. In some embodiments, the process 1000 of FIG. 10 is executed using an ORM, such as ORM 130.

At 1002, an indication that a UI is draft aware is received from the UI layer via an API between the ORM and the UI layer. The draft aware indication indicates that the UI is compatible with the ORM. A UI is draft aware in the event the UI is configured to allow the users to make modifications to a data set via draft entries, draft values, and edit states. A UI is not draft aware in the event the UI is not configured to allow the users to make modifications to a data set via draft entries, draft values, and edit states.

At 1004, it is determined whether a data set supports draft modifications. A data set supports draft modifications if it includes draft values and edit state values and the capability of being modified through the use of draft entries.

In the event the data set is determined to support draft modifications, then the process proceeds to 1008 and one or more modifications are received from the UI layer for the data set. In the event the data set is determined to be incapable of supporting draft modifications, then the process proceeds to 1006 and the data set is modified to be capable of supporting draft modifications. The data set is modified to be capable of supporting draft modifications by adding a draft value column and an edit state value column to the data set and adding the capability of being modified through the use of draft entries. Subsequently, the process proceeds to 1008.

Figure 11:
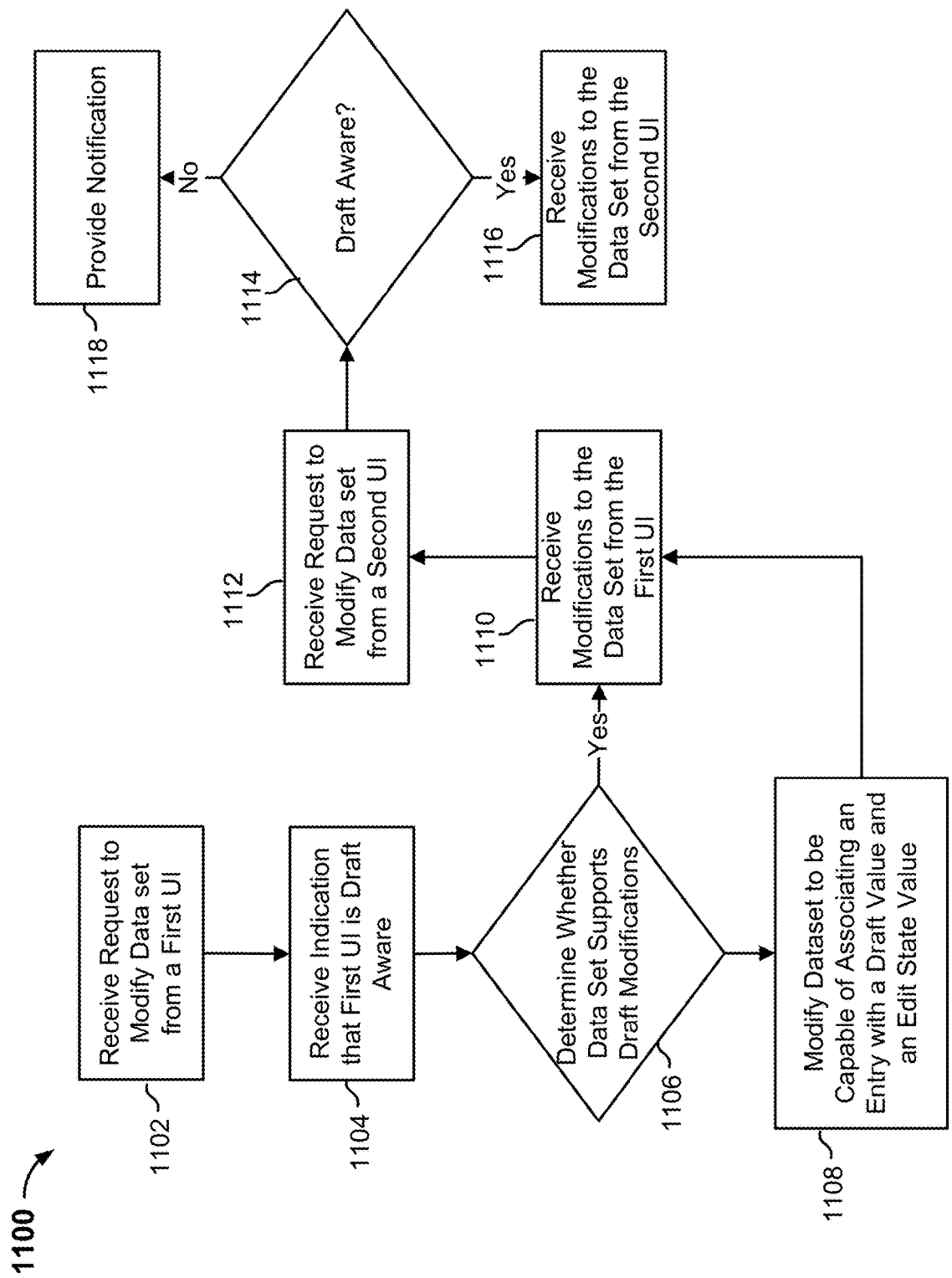
FIG. 11 is a flowchart depicting an example of a process of resolving data set version conflicts with outdated UIs.

FIG. 11 is a flowchart depicting an example of a process of resolving data set version conflicts with outdated UIs. In some embodiments, the process 1100 of FIG. 11 is executed using an ORM, such as ORM 130.

At 1102, a request to modify a data set is received from a first UI via an API between the UI layer and the ORM. The request may be a request to create an entry to the data set, a request to edit one or more values of an entry of the data set, or a request to delete an entry of the data set.

At 1104, an indication that the first UI is draft aware is received. The draft aware indication indicates that the UI is compatible with the ORM.

At 1106, it is determined whether a data set supports draft modifications. A data set supports draft modifications if it includes draft values and edit state values and the capability of being modified through the use of draft entries.

In the event the data set is determined to support draft modifications, then the process proceeds to 1110 and one or more modifications are received from the first UI layer for the data set. In the event the data set is determined to be incapable of supporting draft modifications, then the process proceeds to 1108 and the data set is modified to be capable of supporting draft modifications. The data set is modified to be capable of supporting draft modifications by adding a draft value column and an edit state value column to the data set and adding the capability of being modified through the use of draft entries. Subsequently, the process proceeds to 1110.

At 1112, a request to modify a data set is received from a second UI via an API between the UI layer and the ORM.

At 1114, it is determined whether the second UI is draft aware. The second UI is determined to be draft aware based on whether an indication is received from the second UI that indicates the second UI is draft aware. A UI is draft aware in the event the UI is configured to allow the users to make modifications to a data set via draft entries, draft values, and edit states. In the event the second UI is draft aware, the process proceeds to 1116 and one or more modifications can be received from the second UI layer for the data set. In the event the second UI is not draft aware, the process proceeds to 1118 and a notification is provided to the second UI. A UI is not draft aware in the event the UI is not configured to allow the users to make modifications to a data set via draft entries, draft values, and edit states. The notification can be an update message notifying the second UI that it needs to be updated or an error message that the second UI is not allowed to make changes to the data set.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   determining whether the data set supports draft modifications by determining that the data set includes draft values and edit values and is capable of being modified through use of draft entries;
   when the data set is determined not to support draft modifications, modifying the data set to be capable of supporting draft modifications by adding a draft value column for including the draft value and an edit state column for including the edit state value to the data set;
   receiving a request to modify a data set that supports draft modifications, wherein the data set comprises a plurality of entries, the plurality of entries each comprising:
      a corresponding draft value, wherein the draft value is a value that points to a draft entry when an existing entry within the data set is being edited or deleted; and
      a corresponding edit state value that indicates whether a corresponding entry in the plurality of entries is in a published state or a preview state;
   modifying the data set at least in part by creating a draft entry based at least in part on the request, wherein an edit state value of the draft entry indicates that the draft entry is in the preview state, and wherein the draft value of an existing entry within the plurality of entries points to the draft entry when the draft entry is editing or deleting the existing entry;
   receiving a request to render the data set, the request indicating whether to render a published version or a preview version;
   determining entries of the data set to be rendered based at least in part on the edit state of the entries; and
   providing the determined entries of the data set to a user interface layer that renders the determined entries in a display.

2. The method of claim 1, wherein the request to modify the data set includes at least one of: an edit to an existing entry, a deletion of the existing entry, and/or a creation of a new entry.

3. The method of claim 1, wherein the modifying of the data set further comprises updating a draft value of an entry to be modified to reference the draft entry.

4. The method of claim 1, wherein at least one of the plurality of entries references an entry of another data set, and the user interface layer renders the determined entries based at least in part on the entry of the other data set.

5. The method of claim 1, further comprising:
receiving an indication to commit an edit of an existing entry to the data set;
copying one or more values associated with the draft entry to the existing entry;
deleting the draft entry; and
deleting a draft value and an edit state value associated with the existing entry.

6. The method of claim 1, further comprising:
receiving an indication to commit a deletion of an existing entry to the data set; and
deleting the draft entry associated with the existing entry and the existing entry.

7. The method of claim 1, further comprising:
receiving an indication to commit a creation of a new entry to the data set; and
deleting edit state values associated with the new entry.

8. The method of claim 1, further comprising:
receiving an indication to discard a modification associated with the request to modify the data set; and
deleting the draft entry associated with the modification from the data set.

9. The method of claim 8, further comprising:
deleting a draft value and an edit state value of the entry associated with the modification.

10. The method of claim 1, further comprising:
receiving a second request to modify the data set before modifications to the data set are committed; and
modifying the data set at least in part by creating a second draft entry, wherein a draft value of the draft entry references the second draft entry.

11. The method of claim 10, further comprising:
receiving a request to render a level two preview version, wherein the rendered data set includes the second draft entry.

12. The method of claim 1, further comprising:
receiving a second request to modify the data set;
determining whether a user interface associated with the second request is draft aware;
in the event the user interface associated with the second request is not draft aware, providing a notification to the user interface associated with the second request; and
in the event the user interface associated with the second request is draft aware, modifying the data set at least in part based on one or more inputs received from the user interface associated with the second request.

13. The method of claim 1, wherein modifying the data set further includes:
receiving an indication that a user interface associated with the request to modify the data set is draft aware;
determining whether the data set supports draft modifications; and
modifying the data set to support draft modifications.

14. A system, comprising:
one or more processors configured to:
determine whether a data set supports draft modifications by determining that the data set includes draft values and edit values and is capable of being modified through use of draft entries;
when the data set is determined not to support draft modifications, modify the data set to be capable of supporting draft modifications by adding a draft value column for including the draft value and an edit state column for including the edit state value to the data set;
receive a request to modify a data set that supports draft modifications, wherein the data set comprises a plurality of entries, the plurality of entries each comprising:
a corresponding draft value, wherein the draft value is a value that points to a draft entry when an existing entry within the data set is being edited or deleted; and
a corresponding edit state value that indicates whether a corresponding entry in the plurality of entries is in a published state or a preview state;
modify the data set at least in part by creating a draft entry based at least in part on the request, wherein an edit state value of the draft entry indicates that the draft entry is in the preview state, and wherein the draft value of an existing entry within the plurality of entries points to the draft entry when the draft entry is editing or deleting the existing entry;
receive a request to render the data set, the request indicating whether to render a published version or a preview version;
determine entries of the data set to be rendered based at least in part on the edit state of the entries; and
provide the determined entries of the data set to a user interface layer that renders the determined entries in a display; and
one or more memories coupled to the one or more processors and configured to provide the one or more processors with instructions.

15. The system of claim 14, wherein the request to modify the data set includes at least one of: an edit to an existing entry, a deletion of an existing entry, and/or a creation of a new entry.

16. The system of claim 14, wherein to modify the data set further comprises updating a draft value of an entry to be modified to reference the draft entry.

17. The system of claim 14, wherein at least one of the plurality of entries references an entry of another data set, and the user interface layer renders the determined entries based at least in part on the entry of the other data set.

18. A computer program product, the computer product being embodied in a tangible non-transitory computer readable storage medium and comprising instructions for:
determining whether a data set supports draft modifications by determining that the data set includes draft values and edit values and is capable of being modified through use of draft entries;
when the data set is determined not to support draft modifications, modifying the data set to be capable of supporting draft modifications by adding a draft value column for including the draft value and an edit state column for including the edit state value to the data set;
receiving a request to modify a data set that supports draft modifications, wherein the data set comprises a plurality of entries, the plurality of entries each comprising:

a corresponding draft value, wherein the draft value is
　　　a value that points to a draft entry when an existing
　　　entry within the data set is being edited or deleted;
　　　and
　　a corresponding edit state value that indicates whether
　　　a corresponding entry in the plurality of entries is in
　　　a published state or a preview state;
　modifying the data set at least in part by creating a draft
　　entry based at least in part on the request, wherein an
　　edit state value of the draft entry indicates that the draft
　　entry is in the preview state, and wherein the draft value
　　of an existing entry within the plurality of entries points
　　to the draft entry when the draft entry is editing or
　　deleting the existing entry;
　receiving a request to render the data set, the request
　　indicating whether to render a published version or a
　　preview version;
　determining entries of the data set to be rendered based at
　　least in part on the edit state of the entries; and
　providing the determined entries of the data set to a user
　　interface layer that renders the determined entries in a
　　display.
　19. The computer program product of claim 18, wherein the request to modify the data set includes at least one of: an edit to an existing entry, a deletion of the existing entry, and/or a creation of a new entry.

* * * * *